UNITED STATES PATENT OFFICE.

ROBERT F. S. HEATH, OF CAMDEN, NEW JERSEY, ASSIGNOR, BY DIRECT AND MESNE ASSIGNMENTS, OF FORTY-NINE ONE-HUNDREDTHS TO HENRY D. HUGHES, OF STRAFFORD, PENNSYLVANIA.

COMPOSITION FOR MANUFACTURING CALCIUM CARBIDS.

SPECIFICATION forming part of Letters Patent No. 589,967, dated September 14, 1897.

Application filed March 2, 1896. Serial No. 581,440. (Specimens.)

*To all whom it may concern:*

Be it known that I, ROBERT F. S. HEATH, a citizen of the United States, and a resident of the city of Camden, in the county of Camden and State of New Jersey, have invented a new and useful Improvement in Compositions for the Manufacture of Calcium Carbids, of which the following is a specification.

The primary object of my invention consists in the production of calcium carbid on an economical commercial basis by using a new and useful composition.

My invention essentially consists in the use of a definite mixture of lime, (calcium oxid,) carbon, and the chlorid of an alkali metal.

The ingredients are pulverized and thoroughly intermixed, and the compound is then placed in a suitable furnace and subjected to the action of a powerful electric current, by which means the lime is reduced and fuses with the carbon to form calcium carbid ($CaC_2$) containing a small amount of sodium carbid.

An important feature of the present invention is the use of the chlorid of an alkali metal in combination with the lime and carbon. The alkali-metal chlorid acts as a flux, facilitates the reduction of the lime, thus effecting a great saving of time and proportionately increases the daily output of calcium carbid from each furnace.

While common salt (sodium chlorid) has been generally used in my experiments, potassium chlorid answers equally well and may be substituted.

In the place of quicklime an equivalent amount of any of the natural calcium carbonates—such as limestone, chalk, or oyster-shells—may be used, as in the process of fusing in the furnace they will be first reduced to the condition of lime or calcium oxid. For the carbon necessary any of the forms—such as coke, coal, or charcoal—may be employed.

I have found by experiments that the following are the preferable proportions for the compound: nine parts of quicklime, four parts of carbon, and one-quarter ounce of chlorid of sodium or potassium to each pound of the aforesaid mixed lime and carbon.

I claim—

A composition for the production of carbid of calcium and sodium, consisting substantially of quicklime nine parts, carbon four parts, and one-quarter ounce of sodium or potassium chlorid to the pound of the aforesaid mixed lime and carbon.

In testimony whereof I affix my signature in presence of two witnesses.

ROBERT F. S. HEATH.

Witnesses:
FRANCIS D. PASTORIUS,
GEORGE D. BORTON.